(12) United States Patent
Bergin et al.

(10) Patent No.: US 7,347,964 B2
(45) Date of Patent: Mar. 25, 2008

(54) METHOD AND APPARATUS FOR DEMOLDING A GOLF BALL

(75) Inventors: Thomas F. Bergin, Holyoke, MA (US); Vincent J. Simonds, Brimfield, MA (US); Thomas A. Veilleux, Charlton, MA (US)

(73) Assignee: Callaway Golf Company, Carlsbad, CA (US)

(*) Notice: Subject to any disclaimer, the term of this patent is extended or adjusted under 35 U.S.C. 154(b) by 358 days.

(21) Appl. No.: 11/161,798

(22) Filed: Aug. 17, 2005

(65) Prior Publication Data

US 2007/0042067 A1    Feb. 22, 2007

(51) Int. Cl.
*B29C 45/40* (2006.01)

(52) U.S. Cl. .............. 264/279.1; 264/334; 425/116; 425/436 RM; 425/443

(58) Field of Classification Search ........ 425/116, 425/436 R, 436 RM, 443; 264/279.1, 334
See application file for complete search history.

(56) References Cited

U.S. PATENT DOCUMENTS

| | | |
|---|---|---|
| 721,462 A | 2/1903 | Richards |
| 1,696,652 A * | 12/1928 | Smith ................ 249/205 |
| 2,940,128 A | 6/1960 | Howerman et al. |
| 3,034,791 A | 5/1962 | Gallagher |
| 3,068,522 A | 12/1962 | Nickerson et al. |
| 3,112,521 A | 12/1963 | Ward |
| 3,130,102 A | 4/1964 | Watson et al. |
| 3,147,324 A * | 9/1964 | Ward ................. 264/254 |
| 3,177,280 A | 4/1965 | Ford et al. |
| 3,584,470 A | 6/1971 | Zearfoss, Jr. |
| 3,616,101 A | 10/1971 | Satchell et al. |
| 3,979,126 A | 9/1976 | Dusbiber |
| 3,989,568 A | 11/1976 | Isaac |
| 4,123,061 A | 10/1978 | Dusbiber |
| 4,203,941 A | 5/1980 | Brooker |
| 4,541,795 A | 9/1985 | Cole |
| 4,959,000 A | 9/1990 | Giza |
| 5,006,288 A | 4/1991 | Rhodes, Jr. et al. |
| 5,006,297 A | 4/1991 | Brown et al. |
| 5,112,556 A | 5/1992 | Miller |
| 5,194,191 A | 3/1993 | Nomura et al. |
| 5,334,673 A | 8/1994 | Wu |
| 5,484,870 A | 1/1996 | Wu |
| 5,692,974 A | 12/1997 | Wu et al. |
| 5,703,193 A | 12/1997 | Rosenberg et al. |
| 5,733,428 A | 3/1998 | Calabria et al. |
| 5,840,351 A * | 11/1998 | Inoue et al. ............... 425/556 |
| 5,874,038 A * | 2/1999 | Kasashima et al. ......... 264/279 |
| 5,885,172 A | 3/1999 | Hebert et al. |
| 5,888,437 A | 3/1999 | Calabria et al. |

(Continued)

FOREIGN PATENT DOCUMENTS

JP        05137817 A  *  6/1993

*Primary Examiner*—Robert B. Davis
(74) *Attorney, Agent, or Firm*—Michael A. Catania; Elaine H. Lo

(57) ABSTRACT

An apparatus and method for demolding golf balls from a mold cavity are disclosed. More specifically, an apparatus and method for demolding a golf ball from a mold cavity subsequent to forming a cover layer without the use of ejector or knockout pins are disclosed. The molding apparatus utilizes an undercut configuration that, upon opening the molds after molding a golf ball, serves to impart a rotational force upon the ball and dislodge it from the molds.

15 Claims, 2 Drawing Sheets

U.S. PATENT DOCUMENTS

| | | |
|---|---|---|
| 5,897,884 A | 4/1999 | Calabria et al. |
| 5,908,358 A | 6/1999 | Wu |
| 5,947,843 A | 9/1999 | Calabria et al. |
| 6,328,921 B1 | 12/2001 | Marshall et al. |
| 6,520,873 B2 * | 2/2003 | Inoue et al. ................ 473/378 |
| 6,575,728 B2 * | 6/2003 | Brum ......................... 425/408 |

* cited by examiner

METHOD AND APPARATUS FOR DEMOLDING A GOLF BALL

BACKGROUND OF THE INVENTION

1. Field of the Invention

The present invention relates to manufacturing a golf ball. More specifically, the present invention relates to a method and apparatus for demolding a golf ball precursor product from a mold cavity.

2. Description of the Related Art

Golf balls are frequently conventionally made by molding a core of elastomeric or polymeric material into a spheroid shape. A cover is then molded around the core. Sometimes, before the cover is molded about the core, an intermediate layer is molded about the core and the cover is then molded around the intermediate layer. The molding processes used for the cover and the intermediate layer are similar and usually involve either compression molding or injection molding.

In compression molding, the golf ball core is inserted into a central area of a two piece die and pre-sized sections of cover material are placed in each half of the die, which then clamps shut. The application of heat and pressure molds the cover material about the core.

Blends of polymeric materials have been used for modern golf ball covers because certain grades and combinations have offered certain levels of hardness to resist damage when the ball is hit with a club and elasticity to allow responsiveness to the hit. Some of these materials facilitate processing by compression molding, yet disadvantages have arisen. These disadvantages include the presence of seams in the cover, which occur where the pre-sized sections of cover material were joined, and long process cycle times which are required to heat the cover material and complete the molding process.

Injection molding of golf ball covers arose as a processing technique to overcome some of the disadvantages of compression molding. The process involves inserting a golf ball core into a die, closing the die and forcing a heated, viscous polymeric material into the die. The material is then cooled and the golf ball is removed from the die. Injection molding is well-suited for thermoplastic materials, but has limited application to some thermosetting polymers. However, certain types of these thermosetting polymers often exhibit the hardness and elasticity desired for a golf ball cover. Some of the most promising thermosetting materials are reactive, requiring two or more components to be mixed and rapidly transferred into a die before a polymerization reaction is complete. As a result, traditional injection molding techniques do not provide proper processing when applied to these materials.

Reaction injection molding is a processing technique used specifically for certain reactive thermosetting plastics. As mentioned above, by "reactive" it is meant that the polymer is formed from two or more components that react. Generally, the components, prior to reacting, exhibit relatively low viscosities. The low viscosities of the components allow the use of lower temperatures and pressures than those utilized in traditional injection molding. In reaction injection molding, the two or more components are combined and reacted to produce the final polymerized material. Mixing of these separate components is critical, a distinct difference from traditional injection molding.

The process of reaction injection molding a golf ball cover involves placing a golf ball core into a die, closing the die, injecting the reactive components into a mixing chamber where they combine, and transferring the combined material into the die. The mixing begins the polymerization reaction, which is typically completed upon cooling of the cover material.

Ejector or knockout pins are typically utilized to remove golf balls, particularly injection molded golf balls, from a mold. In such processes, the cover layer(s) is molded, and after the mold opens, ejector or knockout pins are actuated to push or eject the ball from the mold. The pins often cause cosmetic defects such as holes or pin marks in the cover layer(s), which in turn requires additional handling to produce a golf ball suitable for use and sale, or the scrapping of the ball. Accordingly, it would be desirable to provide an apparatus and method for demolding a golf ball without the use of ejector or knockout pins.

BRIEF SUMMARY OF THE INVENTION

The exemplary embodiments described herein provide an improved apparatus and method for demolding a golf ball after molding a cover layer. This results in a reduction of cosmetic defects and cover damage, produces enhanced properties and achieves more efficient molding processes. The cover layer can be molded by any molding process known in the art. In a preferred embodiment, the cover is molded by casting, injection molding or reaction injection molding, and more preferably by reaction injection molding.

In one aspect, the exemplary embodiments provide a molding assembly comprising a first mold member defining a first engagement face and a first generally hemispherical molding surface. The molding assembly also comprises a second mold member defining a second engagement face and a second generally hemispherical molding surface. Upon engagement by the molding members along the first and second engagement faces, the first and second molding surfaces define a molding chamber sized to accommodate a golf ball core or golf ball intermediate assembly. Each of the molding members defines a maximum undercut angle extending between (a) a plane (i) bisecting the molding chamber and (ii) parallel to at least a portion of each of the first and second engagement faces, and (b) an undercut edge extending along a portion of at least one of the first and second engagement faces. The maximum undercut angle is from about 1 degree to about 35 degrees.

In another aspect according to the exemplary embodiments, a molding assembly adapted for molding a golf ball is provided. The assembly comprises a lower mold half having an upwardly directed first face and a first molding surface. The assembly also comprises an upper mold half having a downwardly directed second face and a second molding surface. The first and second faces define a collection of non-planar parting lines upon engagement of the lower and upper mold halves. A maximum undercut angle is defined extending between (i) an undercut edge defined on one of the first and second faces, and (ii) a plane bisecting a molding chamber defined by the first and second molding surfaces.

In yet another aspect according to the exemplary embodiments, a process for producing a golf ball is provided. The process comprises providing a molding assembly including (i) a first mold member defining a first engagement face and a first generally hemispherical molding surface. The molding assembly also includes (ii) a second mold member defining a second engagement face and a second generally hemispherical molding surface. The molding assembly defines a maximum undercut angle greater than 1 degree. The process also comprises disposing a golf ball core or intermediate golf ball assembly into at least one of the first and second molding surfaces. The process also comprises engaging the first mold member and a second mold member together to thereby enclose the golf ball core or intermediate assembly within a molding chamber. The process further comprises introducing a flowable molding material into the molding chamber and about the golf ball core or intermediate assembly. And, the process also comprises at least partially solidifying the molding material about the golf ball core or intermediate assembly to thereby form a golf ball.

Further aspects of the exemplary embodiment process involve separating the mold members from one another after molding of the golf ball, whereby the unique configuration of each molding member resulting from the provision of the noted undercut angle, causes displacement or dislodgement of the golf ball from the molding assembly.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

The exemplary embodiments provide, in a first aspect, a molding apparatus, preferably an injection molding apparatus or reaction injection molding apparatus, for forming a golf ball cover layer. The molding apparatus comprises a first mold member defining a generally hemispherical first mold surface, and a second mold member defining a similar generally hemispherical second mold surface. The first and second mold surfaces are designed with non-planar parting lines within selected segments. The non-planar segments create an undercut region in both the first and second mold members, which is described in greater detail herein. Generally, the undercut or undercut region as described herein, is a region of the molding chamber over which a portion of the mold engagement face extends. That is, a slight overhang or protruding section of molding surface exists, when the mold assembly is viewed in cross section at right angles to the axis along which the mold members are opened and closed. Upon the mold opening after a cover layer has been formed, the segmented undercuts generate opposing force vectors acting about the geometric center of the golf ball, and a resultant rotational force vector is created. This rotational force acts to separate the molded ball from the cavity without the use of ejector pins.

In another aspect, the exemplary embodiments provide a method for demolding a golf ball without the use of ejector or knockout pins. The method comprises positioning a golf ball core or core and mantle or inner layer(s) in a molding apparatus having upper and lower mold members, wherein the upper and lower mold members have non-planar parting lines and undercut regions as described herein, closing the mold around the golf ball core, providing a flowable material to the mold, molding the cover layer about the core, opening the upper and lower mold members, thereby creating opposing forces on the molded golf ball to remove the golf ball from the molding apparatus.

The exemplary embodiments also relate to a molding apparatus for producing improved golf balls, particularly a golf ball cover layer. The exemplary embodiments also further relate to a method for producing improved golf balls and golf ball cover layers.

In one particular embodiment, a golf ball molding apparatus for forming a cover layer on a golf ball is disclosed. The cover layer(s) may be formed from any material suitable for use as a cover, including, but not limited to, ionomers, non-ionomers and blends of ionomers and non-ionomers. The cover may be formed by any suitable method known in the art, including, but not limited to, casting, compression molding, injection molding and reaction injection molding.

Figure 1:
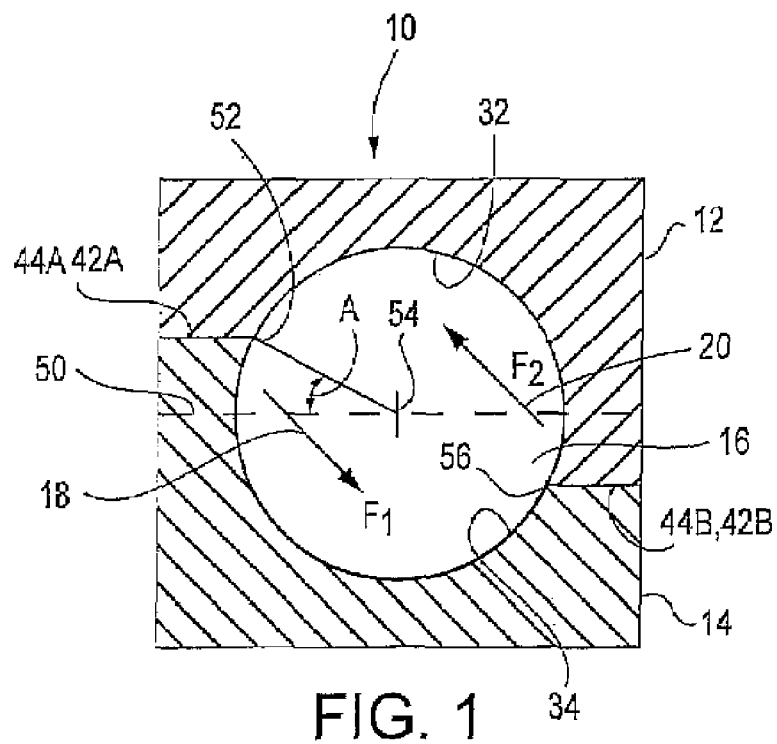
FIG. 1 is a cross-sectional view of a preferred embodiment golf ball mold assembly of the exemplary embodiment in a closed position.

Turning to FIG. 1, a preferred embodiment golf ball mold assembly 10 in accordance with the exemplary embodiment is illustrated. The golf ball mold assembly in FIG. 1 is illustrated as being in a closed position. The preferred golf ball mold assembly 10 includes an upper mold member 12 and a lower mold member 14. The upper and lower mold members 12 and 14 each define a generally hemispherical opening, and define a molding surface 32 and 34, respectively, in opposing faces of the upper and lower mold members 12 and 14 of the molding assembly 10. When the upper and lower members 12 and 14 are closed, and the generally hemispherical molding surfaces 32 and 34 are aligned with each other, the resulting cavity has a spherical configuration. Each of the generally hemispherical molding surfaces 32 and 34 defines a plurality of protrusions or protruding regions that, upon molding a cover layer therein, produce corresponding dimples or depressions in the outer surface of the cover layer.

Figure 2:
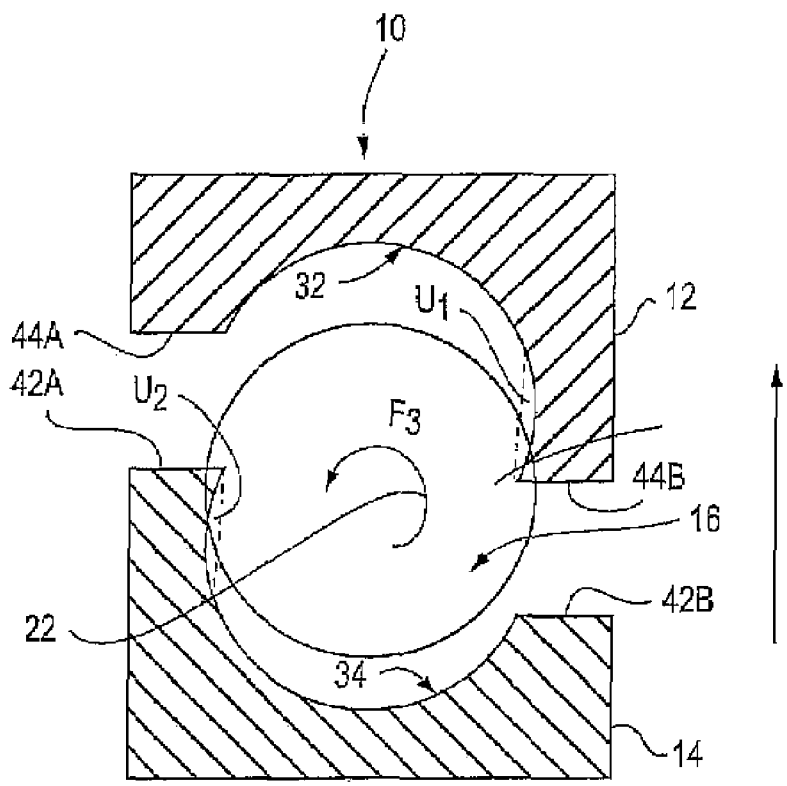
FIG. 2 is a cross-sectional view of a preferred embodiment golf ball mold assembly depicted in FIG. 1 in an open position.

FIG. 2 shows the preferred embodiment golf ball mold assembly 10 of FIG. 1 in an open position. Each of the mold members engages the other along non-planar parting lines 42A, 42B, 44A and 44B. Each of the mold members defines a mold engagement face along which the other mold member engagement face contacts upon closing the mold. When the mold is viewed in elevation, as in FIGS. 1 and 2, the engagement faces define the parting lines. The non-planar parting lines 42A, 42B, 44A and 44B create "undercuts" or undercut regions proximate the parting lines 42a and 44B of the lower and upper mold members, respectively. Referring further to FIG. 2, a first undercut region $U_1$, is illustrated proximate the parting line 44B of the first mold member 12. And, a second undercut region $U_2$ is illustrated proximate the parting line 42A of the second mold member 14. When the mold members open, the segmented undercuts generate opposing force vectors F1 (18) and F2 (20), see FIG. 1, that act on the geometric center of the golf ball 16. A resultant rotational force vector F3 (22) is created, and the rotational force vector F3 serves to separate the molded ball 16 from the molding cavity without the use of ejector pins or other devices.

As will be appreciated, the upper and lower mold members 12 and 14 are preferably formed from a metal or other suitable material known in the art. A mixing chamber, runner or other device may, as known in the art, precedes the molding assembly 10 to provide flowable molding material to the molding assembly.

A preferred method of making a golf ball in accordance with the exemplary embodiment is as follows. A golf ball core (or core and mantle and/or inner layer(s)) made by techniques known in the art such as casting or other molding techniques is obtained. The core is preferably positioned within a mold such as the mold assembly 10. It is preferred that the core is supported on a plurality of support pins or other protrusions (not shown) to center the core within the mold 10. The mold 10 is then closed. The cover layer is molded about the core by any method known in the art, such as injection molding or reaction injection molding, to form a golf ball 16. The mold 10 is then opened to allow removal of the golf ball 16. As the mold opens, the segmented parting lines 42A, 42B, 44A and 44B and specifically, parting lines 42A and 44B and the undercut regions $U_1$ and $U_2$, create opposing forces F1 (18) and F2 (20) that act on the geometric center of the golf ball 16. A resultant rotational force vector F3 (22) is created, and the rotational force vector F3 acts to separate the molded ball 16 from the molding cavity without the use of ejector pins or other devices. The use of the non-planar segmented parting line mold having the noted undercut regions reduces or eliminates the need to manually remove the golf ball 16 from the mold 10 due to sticking or other consequences of molding.

Referring further to FIG. 1, additional preferred aspects of the exemplary embodiment molding assembly 10 are depicted. The extent of the undercut aspect can be quantified by reference to the angle extending between the undercut mold edge and a plane that intersects the center of the molding cavity and which is parallel to the parting lines that define the mold undercut edges. Specifically, FIG. 1 depicts a horizontal plane 50 intersecting the mold assembly 10 and the center 54 of the molding cavity. The plane 50 bisects the molding cavity. The undercut parting lines 44A and 42A define a mold undercut edge 52. When viewed in cross section, the maximum angle A extending between the undercut edge 52 and the bisecting plane 50 is designated herein as the maximum undercut angle, and shown in FIG. 1 as angle A. Angle A may range from about 1° to about 35°, more particularly from about 5° to about 30°, more particularly from about 10° to about 25°, and preferably from about 15° to about 20°. However, it is to be appreciated that the particular maximum undercut angle depends upon a wide array of factors including the amount of force necessary to displace or otherwise dislodge the molded golf ball from the molding surface, the materials used in forming the cover layer of the golf ball, the materials used for forming the mold or molding members, whether mold release agents are utilized, the rate of production or molding, and the temperatures of the various components. Generally, the exemplary embodiment includes any molding member having a maximum undercut angle of at least 1°. However, it is contemplated that for certain critical applications, it may be useful or even necessary to employ a maximum undercut angle of less than 1°.

It is preferred that the undercut edge defined on the other side of the mold assembly is symmetrical, and so, a corresponding mold undercut edge 56 is defined at the same angle however along an opposite side of the bisecting plane 50.

Figure 3:
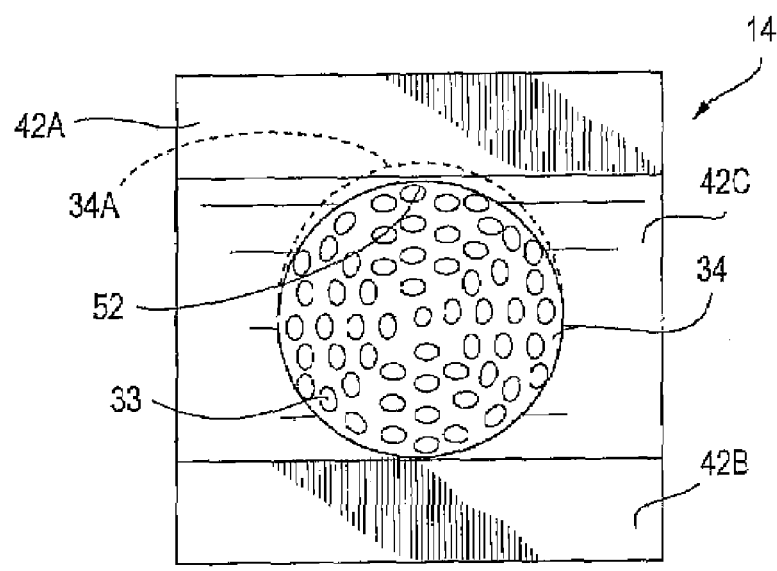
FIG. 3 is a planar view of one of the mold members of the mold assembly shown in FIG. 1.
Figure 4:
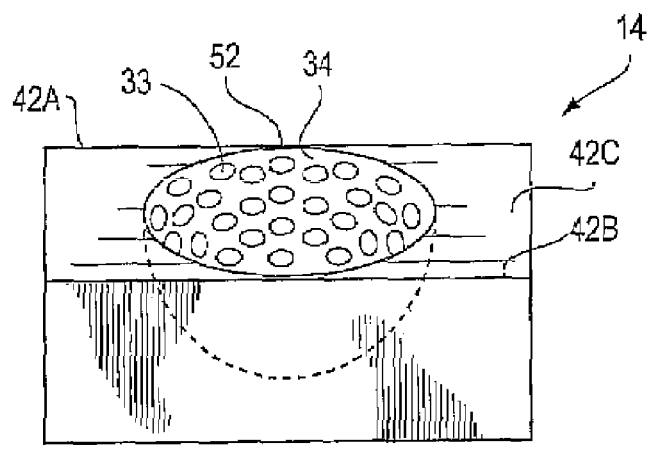
FIG. 4 is a front elevational view of the mold member depicted in FIG. 3.
Figure 5:
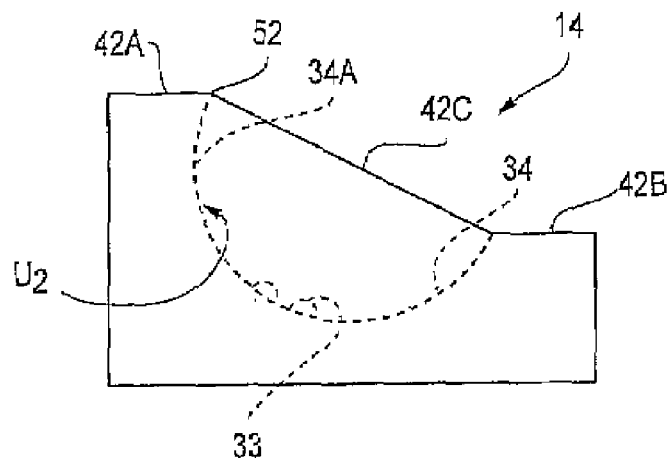
FIG. 5 is a side elevational view of the mold member shown in FIGS. 3 and 4.

FIGS. 3-5 illustrate front, side, and top views of the lower mold member 14. It will be appreciated that the upper mold member 12 exhibits a similar configuration. Specifically, FIG. 3 exhibits a top view of the lower mold member 14. The undercut edge 52 can be seen extending over a region of the mold surface 34. Specifically, the edge 52 extends over a region of the mold surface 34 designated in FIG. 3 as region 34A. FIGS. 4 and 5 depict front and side views of the lower mold cavity half 14. The molding surface 34 optionally includes a plurality of raised projections 33 that form dimples in the resulting golf ball products. As can be seen in FIGS. 3-5, the lower mold cavity half 14 defines an engagement face at which the molding surface 34 is accessible. The engagement face includes a first region that defines a first parting line 42A, a second region that defines a second parting line 42B, and a transition region 42C extending between the first and second regions 42A and 42B, respectively. As previously explained with regard to the non-planar aspect of the parting lines, the first region corresponding to 42A does not extend within the same plane as the second region, corresponding to 42B. Although not necessary, it is preferred that the first and second regions extend within planes that are parallel with each other. As shown in FIG. 5, an undercut region $U_2$ is defined proximate the parting line 42A and a portion of the mold surface 34.

Additional details concerning golf ball materials, characteristics, manufacturing processes, and related information are set forth in U.S. Pat. Nos.: 6,325,731; 6,368,236; 6,369,125; 6,406,384; 6,409,614; 6,413,170; 6,432,000; 6,432,342; 6,433,094; 6,435,983; 6,436,327; 6,441,095; 6,450,898; 6,450,899; 6,451,923; 6,458,047; 6,468,168; 6,469,102; 6,475,417; all of which are hereby incorporated by reference in their entireties.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

What is claimed is:

1. A molding assembly adapted for molding a golf ball, the assembly comprising:
   a lower mold half having an upwardly directed first face and a first molding surface; and
   an upper mold half having a downwardly directed second face and a second molding surface;
   the first and second faces defining a plurality of non-planar parting lines upon engagement of the lower and upper mold halves, wherein a maximum undercut angle is defined as the angle extending between an undercut mold edge and a plane that intersects a center of the molding assembly and which is parallel to the non-planar parting line that defines the mold undercut edge.

2. The molding assembly of claim 1 wherein the first face includes a first region extending in a first plane and a second region extending in a second plane parallel to the first plane.

3. The molding assembly of claim 2 wherein the first face further includes a transition region extending between the first and second regions.

4. The molding assembly of claim 1 wherein the maximum undercut angle is in the range of from about 1° to about 35°.

5. The molding assembly of claim 4 wherein the maximum undercut angle is in the range of from about 50° to about 30°.

6. The molding assembly of claim 5 wherein the maximum undercut angle is in the range of from about 10° to about 25°.

7. The molding assembly of claim 6 wherein the maximum undercut angle is in the range of from about 15° to about 20°.

8. The molding assembly of claim 1 wherein each of the lower mold half and the upper mold half is free of ejector pins.

9. A process for producing a golf ball, the process comprising:
providing a molding assembly including (i) a first mold member defining a first engagement face and a first generally hemispherical molding surface, and (ii) a second mold member defining a second engagement face and a second generally hemispherical molding surface, the first and second engagement faces defining a plurality of non-planar parting lines upon engagement of the first and second mold members, the molding assembly defining a maximum undercut angle greater than 1°, wherein the maximum undercut angle is defined as the angle extending between an undercut mold edge and a plane that intersects a center of the molding assembly and which is parallel to the non-planar parting line that defines the mold undercut edge;
disposing a golf ball core or intermediate golf ball assembly into at least one of the first and second molding surfaces;
engaging the first mold member and the second mold member together to thereby enclose the golf ball core or intermediate assembly within a molding chamber;
introducing a flowable molding material into the molding chamber and about the golf ball core or intermediate assembly; and
at least partially solidifying the molding material about the golf ball core or intermediate assembly, to thereby form a golf ball.

10. The method of claim 9 further comprising:
separating the first mold and the second mold to thereby displace the golf ball from at least one of the first mold and the second mold.

11. The method of claim 10 wherein displacement of the golf ball occurs without the use of an ejector pin.

12. The method of claim 9 wherein the maximum undercut angle is in the range of from about 1° to about 35°.

13. The molding assembly of claim 12 wherein the maximum undercut angle is in the range of from about 5° to about 30°.

14. The molding assembly of claim 13 wherein the maximum undercut angle is in the range of from about 10° to about 25°.

15. The molding assembly of claim 14 wherein the maximum undercut angle is in the range of from about 15° to about 20°.

* * * * *